May 25, 1943. T. R. JAMES 2,319,865
DEVICE FOR SPRAYING LOOSE MATERIAL
Filed Aug. 3, 1940 3 Sheets-Sheet 2
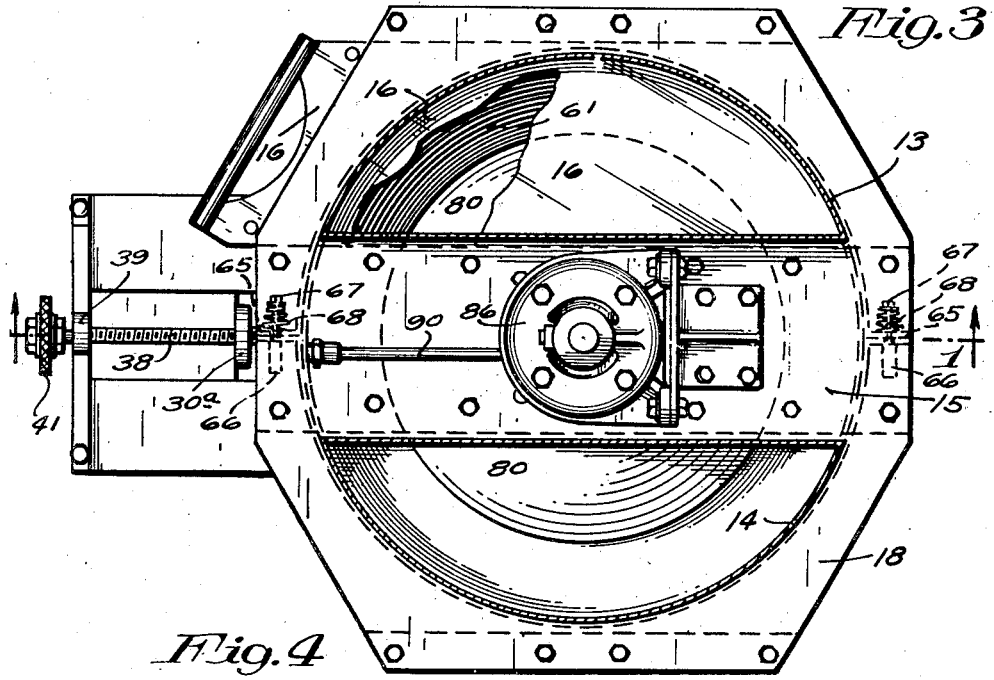
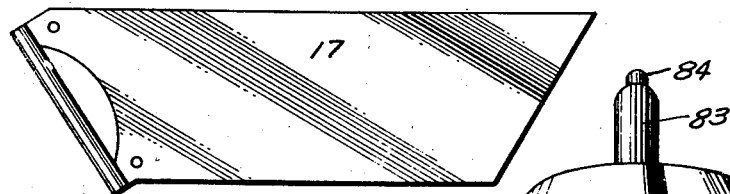
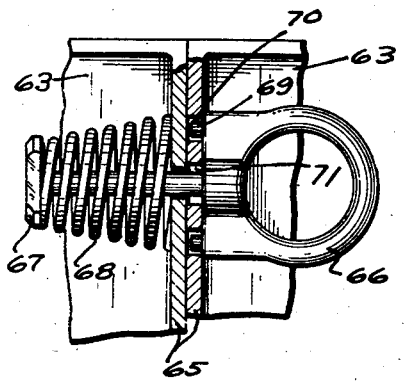
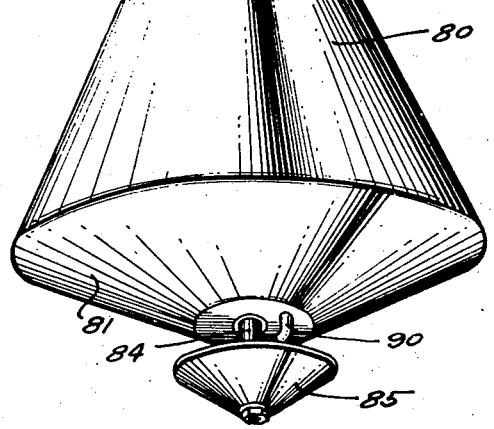
Inventor
Thos. R. James
By Arthur R. Wylie
Atty.

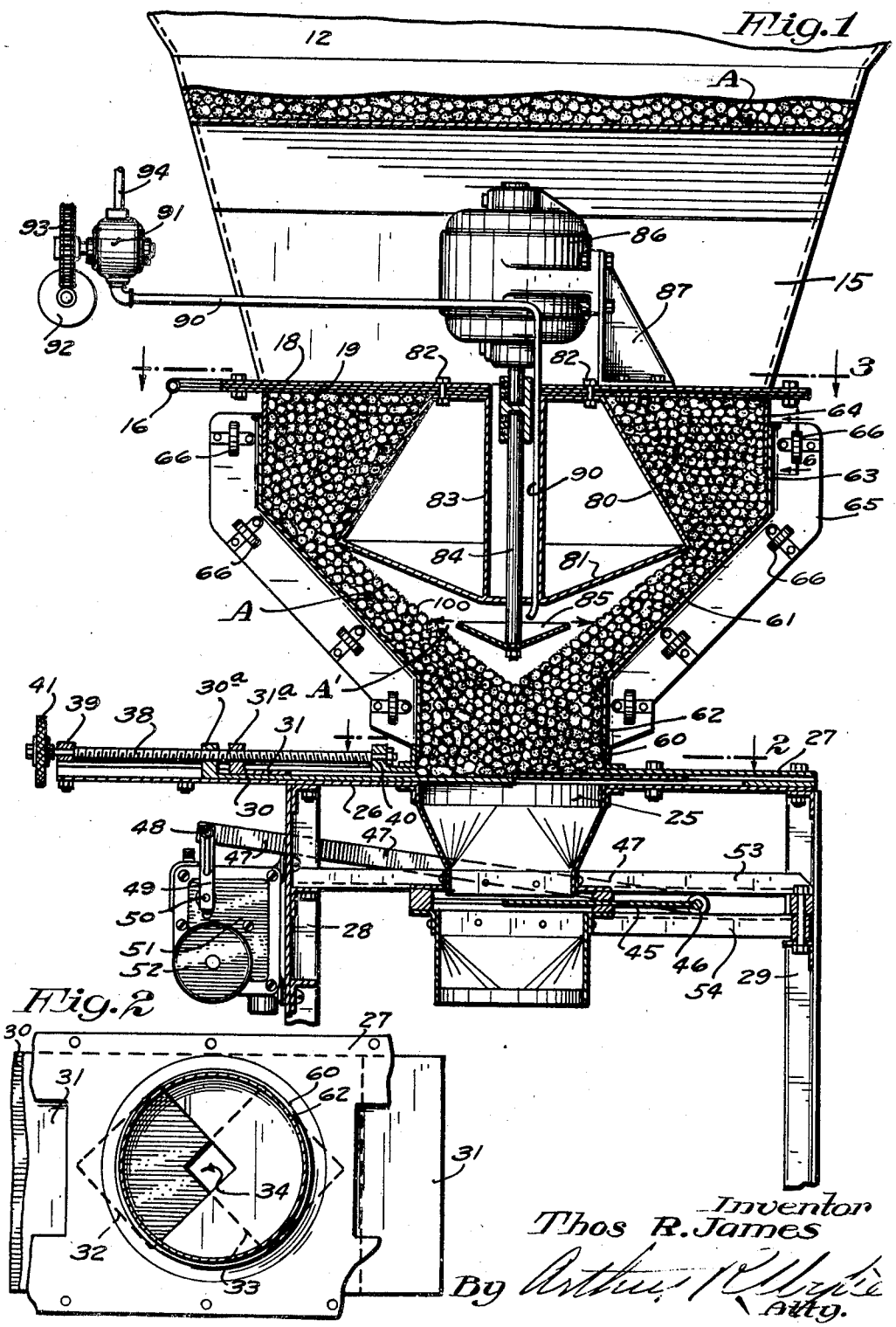

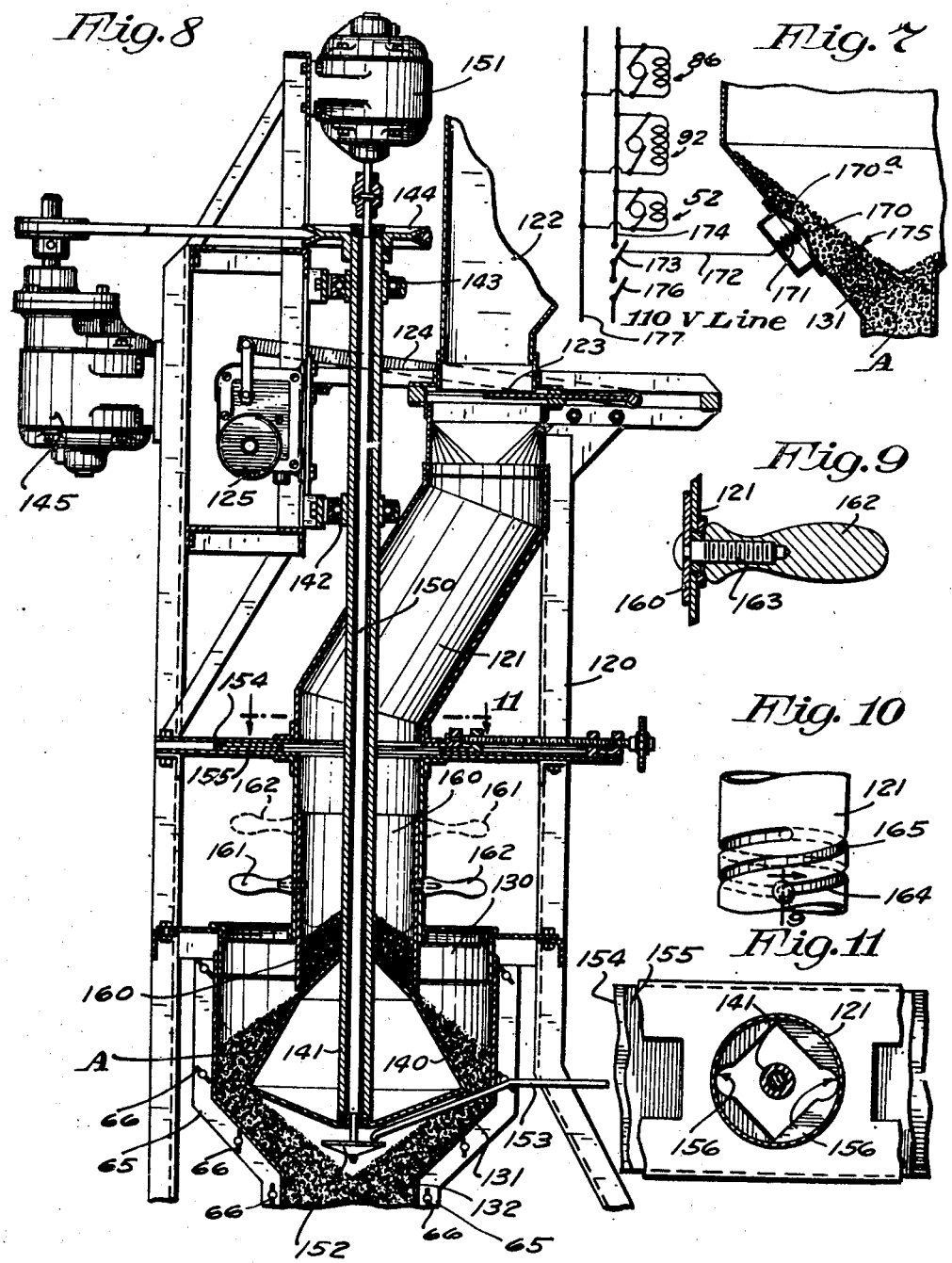

Patented May 25, 1943

2,319,865

UNITED STATES PATENT OFFICE 2,319,865

DEVICE FOR SPRAYING LOOSE MATERIAL

Thomas R. James, Minneapolis, Minn., assignor to General Mills, Inc., a corporation of Delaware Application August 3, 1940, Serial No. 350,929

3 Claims. (Cl. 91—44)

An object of this invention is to provide a simple and efficient means for spraying loose materials as globules, granules, pellets, flour, flakes, and the like which will flow under their own pressure until they assume their normal angle of repose. The spraying in this case particularly being of a globular breakfast food with an oil and water emulsion containing various vitamins and chemicals. Another object is to provide means for forming an open circular moving wall of the material to receive the spray from a central point, the wall being of sufficient thickness to insure that none of the spray will reach the side walls which moreover are scoured by the moving material.

Another object is the provision of means for efficiently controlling the flow of this loose material as well as of the liquid sprayed.

Still another object is to provide means for automatically stopping all operations of the device when the level of the material in the bin falls below a predetermined point.

Another object is to provide means for cleaning the parts adjacent the spray.

These and other objects as will hereinafter appear are accomplished by this invention which is fully described in the following specification and shown in the accompanying drawings in which Figure 1 is a vertical section through one form of the device as applied to the bottom of the bin, as viewed on the line 1—1 of Fig. 3;

Fig. 2 is a partial section on the line 2—2 of Figure 1 except that in Fig. 2 the valve is shown partially open while in Figure 1 it is closed;

Fig. 3 is a section on the line 3—3 of Figure 1;

Fig. 4 is a detail of one of the slides of Fig. 3;

Fig. 5 is a perspective view of the double internal cone of Figure 1;

Fig. 6 is an enlarged detail of the clip as shown on line 6 of Figure 1;

Fig. 7 is a wiring diagram of the motors of this device;

Fig. 8 is a view similar to Figure 1 showing a modified form of the device;

Fig. 9 is an enlarged detail of one of the adjusting handles of Fig. 7 as viewed on the line 9 of Fig. 10;

Fig. 10 is a partial side elevation of the vertically adjustable sleeve; and

Fig. 11 is a partial section on the line 11—11 of Fig. 8.

The embodiment shown in Figures 1 to 6, inclusive, is shown attached to the bottom of a large bin 12 for holding the material to be sprayed, the bottom preferably having two bifurcations 13, 14 with a transverse passage 15 therebetween.

Slide valves 16, 17 are slidably mounted between spaced plates 18, 19 to individually close the two legs of the bifurcation. These slide valves are useful primarily for closing the bottom of the bin so that the apparatus below may be entirely free from pressure of the material in the bin so that these parts may be taken apart for cleaning and inspecting. The bin is supported on suitable beams not shown.

Beneath this bin and spaced therefrom is a passage 25 (Figure 1) which is carried by two transverse plates 26, 27 on suitable supports 28, 29. Between the plates 26, 27 are two reversely slidable valve plates 30, 31 having rectangular openings 32, 33, respectively, both of which are set diagonally with respect to the length of the plates as shown in Fig. 2, so that they overlap to form a varying rectangular opening 34 through which the material to be treated may pass. The plates 30, 31 are provided with lugs 30ª and 31ª, respectively, which are reversely screw-threaded to receive a screw 38 which has right and left threads and is journalled in suitable lugs 39, 40 and is provided with a hand wheel 41 by means of which it may be turned. Thus the plates 30 and 31 move in and out in opposite directions and in equal amounts so as to vary the size of the opening 34 from zero as shown in Figure 1 to the "double diamond" openings of the rectangles 32, 33 when the plates are moved so that the latter are believed in registration.

The passage 25 is preferably round at the top and square at the bottom where it is closed by means of a slide valve 45 which is mounted to slide in suitable grooves and is pivotally connected at one end 46 to a link 47, the opposite end of the link 47 being pivotally connected at 48 to a link 49 which is carried on the end of the shaft 50, the latter being suitably driven by mechanism (not shown) in the box 51 from an electric motor 52. This motor, as will later be explained, operates principally to close the valve 45 when the material in the bin has become exhausted. This valve and its associated parts are carried on suitable members 53, 54 from the supports 28, 29.

Above the plate 27 is a circular ledge 60 adapted to receive the bottom of a conical hopper member 61, this member having a straight bottom portion 62 adapted to fit into the member 60 and a conical intermediate portion with a top cylindrical portion 63 adapted to fit around a cylindrical bottom flange 64 of the hopper 12. The conical member 61 is made in two sections split along the central vertical plane and having meeting flanges 65 secured together by means of clips as shown in Fig. 6. This clip consists of a ring member 66 having a bar 67 passing through meeting openings in the flanges 65 and having a compression spring 68 which yieldably holds these flanges together. This ring is flat and has small pins 69 extending therefrom which are adapted to engage in holes 70 in one of the flanges to prevent the ring from turning. When the ring is turned 90° from the position shown in Fig. 6, it may pass through a slot 71 so that the two halves of the cone 61 may then be separated. This is for the purpose of inspecting and cleaning the inner cone and the spraying device as will now be described.

Within the conical member 61 and spaced therefrom is an inner conical member 80 which is also preferably provided with a conical bottom 81. This member is secured to the plates 18, 19 by means of screws 82 and has a central tube 83 through which extends a vertical shaft 84 which carries at its bottom a depressed disk 85. The shaft 84 is driven by means of a motor 86 supported on a suitable bracket 87 from the plates 18, 19, the motor extending into the space 15.

A small tube 90 extends through the tube 83 alongside the shaft 84 and connects to a pump 91 which is driven by a motor 92 through any form of gear reduction 93, the pump receiving a fluid to be sprayed through a pipe 94 from any suitable source of supply which maintains a substantially constant head.

Thus it will be seen from the foregoing that with the valves 34 and 45 open and with the slide valves 16 and 17 removed, the material in the bin 12 will flow down the two bifurcations through the openings 13, 14 and around the conical member 80 so as to assume a converging internal cone 100, as shown in Figure 1. The angles of the several cones are so selected that the interior of this cone 100 will never touch the disk 85. The liquid to be sprayed on the loose material A is fed down through the pipe 90 and the high speed at which this disk is operated causes this material to be thrown off in the form of an extremely fine spray which penetrates some distance into the mass of material at A'. Since this material is constantly flowing past this point and liquid is continuously fed through the pipe 90, this material will thus be sprayed and there will be a considerable mixing of the loose material thus sprayed with the other loose material which is not directly sprayed so that any sample of this material passing the slide valve 45 will be found to contain an average amount of the sprayed material.

Referring now to Figs 8 to 11, the modified form of the device comprises a frame 120 having a passage 121 adapted to make connection with the bottom of a bin 122 through a cut-off valve 123 similar to the valve 45. This valve is operated by means of a link 124 which is similarly operated by a motor 125.

The passage 121 for the material to be sprayed delivers into a cylinder 130, at the bottom of which is a conical bottom 131 similar to the conical member 61, it likewise being separable into two halves which are secured together by clips 66, as shown in Fig. 6. A cylindrical portion 132 likewise may, if desired, be provided with a "double diamond" valve similar to the valve 30, 31 of Figure 1. This valve however is not repeated in detail in Fig. 8 but serves in this same way to control the speed with which the material acted upon passes the spraying device.

This device is also provided with an internal conical member 140 which, however, is rotatably mounted on a sleeve 141 which is provided with suitable ballbearings 142, 143 and has at its upper end a sheave 144 by means of which it is driven by a motor 145 through a suitable gear reduction since this internal conical member is preferably driven at a relatively slow rate of speed.

A shaft 150 passes through the sleeve 141 and is preferably directly driven by the motor 151 and has at its lower end a disk 152 to which a fluid to be sprayed is delivered through a pipe 153, as previously described in connection with Figure 1.

As shown in Figure 11, a "double diamond" valve may be supplied, as shown in Fig. 11, consisting of two plates 154, 155 which are constructed and operate substantially like the plates 30, 31 except for the fact that they are provided with circular notches 156 to permit them to pass around the sleeve 141.

Another means for controlling the rate of flow of the material is provided in the form of a sleeve 160 which is slidably mounted in the bottom of the passage 121 and carries handles 161, 162 which are tapped to receive a screw 163 carried by the member 160 and which pass through spiral grooves 164 and 165 in the member 121 as shown in Fig. 10.

Thus to adjust the sleeve 160 up or down, both handles 161 and 162 are unscrewed so as to release them. They are then turned to adjust the sleeve 160 up or down to the desired point after which these handles are again turned so as to tighten them on the pipe 121. This adjusts the sleeve 160 toward and from the cone 140 with the result that the rate of the material passing between the sleeve and the cone is thus regulated.

Referring now to Fig. 7, the bin 12 is provided at a point near its bottom with a pressure-operated plate 170 surrounded by a flexible diaphragm 170ª and pressed by a spring 171 and connected through a link 172 to a switch 173 in an electric circuit 174. As long as the bin 12 is filled to a point above a given line 175 with the material to be acted upon, the pressure of this material will cause the plate 170 to be depressed, compressing the spring 171 and holding the switch 173 closed. Soon, however, as the material falls below the level 175, the spring 171 acts to lift the plate 170 thereby opening the switch 173. This switch 173 is connected in the line above a main switch 176, the line 174 then connecting the motors 52, 92, 86 in parallel with the lead 177.

Thus it will be seen that when the level of the material in the bin falls below a predetermined point, the switch 173 will be opened thereby rendering the three motors inoperative. These motors are so timed that the motor 92 supplying liquid to the disk 85 will be stopped in advance of the disk itself so that there will be no tendency for this liquid to accumulate on the disk.

By the use of a "double diamond" valve the opening remains centered for all sizes so that the material flows with nearly equal speeds down all sides of the hollow cone, thereby insuring a uniformly moving surface to receive the spray.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. In apparatus for coating loose material, a passage for the material, one wall of the passage being a downwardly converving cone, a downwardly diverging cone above the first-mentioned cone and spaced therefrom to provide a hollow conical space, the converging cone terminating in a passage substantially smaller than the widest part of the cone, valve means beneath said passage for supporting the material and for controlling its flow so as to provide a solid mass thereabove, and means in the hollow conical space for spraying the material surrounding said space with a liquid.

2. In apparatus for coating loose material, a passage for the material, one wall of the passage being a downwardly converging cone, a downwardly diverging cone above the first-mentioned cone and spaced therefrom to provide a hollow conical space, means for varying the distance between the cones to vary the depth of material in the hollow conical space, the converging cone terminating in a passage substantially smaller than the widest part of the cone, valve means beneath said passage for supporting the material and for controlling its flow so as to provide a solid mass thereabove, and means in the hollow conical space for spraying the material surrounding said space with a liquid.

3. In apparatus for coating loose material, a passage for the material, one wall of the passage being a downwardly converging cone, a downwardly diverging cone above the first-mentioned cone and spaced therefrom to provide a hollow conical space, the converging cone terminating in a passage substantially smaller than the widest part of the cone, a valve means which centers the opening as it opens and closes beneath said passage for supporting the material and for controlling its flow so as to provide a solid mass thereabove, and means in the hollow conical space for spraying the material surrounding said space with a liquid.

THOMAS R. JAMES.